US010022833B2

(12) United States Patent
Sherbrooke et al.

(10) Patent No.: US 10,022,833 B2
(45) Date of Patent: Jul. 17, 2018

(54) HIGH PERFORMANCE MULTI-AXIS MILLING

(71) Applicant: Celeritive Technologies, Inc., Cave Creek, AZ (US)

(72) Inventors: Evan C. Sherbrooke, Moorpark, CA (US); Glenn Coleman, Cave Creek, AZ (US)

(73) Assignee: Celeritive Technologies, Inc., Cave Creek, AZ (US)

( * ) Notice: Subject to any disclaimer, the term of this patent is extended or adjusted under 35 U.S.C. 154(b) by 759 days.

(21) Appl. No.: 13/843,924

(22) Filed: Mar. 15, 2013

(65) Prior Publication Data

US 2013/0297064 A1    Nov. 7, 2013

Related U.S. Application Data

(60) Provisional application No. 61/642,317, filed on May 3, 2012.

(51) Int. Cl.
*G06F 19/00* (2018.01)
*B23Q 15/22* (2006.01)
*B23C 1/12* (2006.01)
*B23C 3/16* (2006.01)

(52) U.S. Cl.
CPC .............. *B23Q 15/22* (2013.01); *B23C 1/12* (2013.01); *B23C 3/16* (2013.01); *Y10T 409/300896* (2015.01); *Y10T 409/307672* (2015.01)

(58) Field of Classification Search
CPC ..... G05D 7/0617; F04B 49/065; F04B 49/20; B23Q 15/22; B23C 3/16; B23C 1/12; Y10T 409/300896; Y10T 409/307672

USPC .......................... 700/159, 184, 190, 177–179
See application file for complete search history.

(56) References Cited

U.S. PATENT DOCUMENTS

| 4,569,014 A * | 2/1986 | Kishi .................... G05B 19/41 |
| | | 700/189 |
| 4,907,164 A | 3/1990 | Guyder |
| 4,975,856 A * | 12/1990 | Vold ...................... B25J 9/1602 |
| | | 318/568.19 |
| 5,285,572 A * | 2/1994 | Rathi et al. .................. 29/889.1 |

(Continued)

FOREIGN PATENT DOCUMENTS

JP    2010003018 A    1/2010

OTHER PUBLICATIONS

Asakawa et al., "Automation of Chamfering by an Industrial Robot; for the Case of Hole on a Free Cured Surface", Oct. 2002, Journal of Robotics and Computer-Integrated Manufacturing, 18 (5-6): 379-385.*

(Continued)

*Primary Examiner* — Chun Cao
*Assistant Examiner* — Zhipeng Wang
(74) *Attorney, Agent, or Firm* — Perkins Coie LLP

(57) ABSTRACT

Technology for milling selected portions of a workpiece by a cutting tool of a numerical control machine is described. The described technology provides methods and apparatuses for milling areas of a part so that more aggressive machining parameters can be used in the toolpath, thereby resulting in reduced machining time and load. The described technology additionally determines directions of the tool axis vector at points along a toolpath in order to achieve a desired part shape while optionally maintaining high material removal rates.

18 Claims, 16 Drawing Sheets

(56) References Cited

U.S. PATENT DOCUMENTS

| | | | |
|---|---|---|---|
| 5,289,383 A | 2/1994 | Sawamura et al. | |
| 5,444,636 A | 8/1995 | Yoshida et al. | |
| 5,532,933 A | 7/1996 | Nakata | |
| 5,662,566 A * | 9/1997 | Marxrieser | G05B 19/4099 409/132 |
| 5,710,709 A * | 1/1998 | Oliver | G05B 19/4067 700/184 |
| 6,004,489 A * | 12/1999 | Huang | B21C 25/02 264/176.1 |
| 6,266,572 B1 | 7/2001 | Yamazaki et al. | |
| 6,311,098 B1 * | 10/2001 | Higasayama | G05B 19/4099 700/159 |
| 6,428,252 B1 | 8/2002 | Oldani | |
| 6,438,445 B1 | 8/2002 | Yoshida et al. | |
| 6,447,223 B1 | 9/2002 | Farah et al. | |
| 6,535,788 B1 | 3/2003 | Yoshida et al. | |
| 6,591,158 B1 | 7/2003 | Bieterman et al. | |
| 6,678,575 B1 | 1/2004 | Graham et al. | |
| 6,745,100 B1 | 6/2004 | Lermuzeaux | |
| 6,772,039 B2 | 8/2004 | Kakino et al. | |
| 6,823,230 B1 | 11/2004 | Jamalabad et al. | |
| 6,824,336 B2 | 11/2004 | Izutsu et al. | |
| 6,895,299 B2 | 5/2005 | Red et al. | |
| 6,942,436 B2 | 9/2005 | Kakino et al. | |
| 6,999,843 B2 | 2/2006 | Matsumoto et al. | |
| 7,069,108 B2 | 6/2006 | Saarela et al. | |
| 7,070,368 B2 | 7/2006 | Murakami et al. | |
| 7,269,471 B2 | 9/2007 | Kadono | |
| 7,287,939 B2 | 10/2007 | Koch | |
| 7,451,013 B2 | 11/2008 | Coleman et al. | |
| 7,577,490 B2 | 8/2009 | Diehl et al. | |
| 7,593,786 B2 | 9/2009 | Saarela et al. | |
| 7,831,332 B2 | 11/2010 | Diehl | |
| 8,265,783 B2 | 9/2012 | Saito | |
| 8,295,972 B2 | 10/2012 | Coleman et al. | |
| 8,489,224 B2 | 7/2013 | Berman et al. | |
| 8,560,113 B2 | 10/2013 | Diehl et al. | |
| 9,489,339 B2 | 11/2016 | Mackman | |
| 9,569,868 B2 | 2/2017 | Sud et al. | |
| 9,690,282 B2 * | 6/2017 | Berman | G05B 19/18 |
| 2001/0048857 A1 * | 12/2001 | Koch | G05B 19/4061 409/132 |
| 2005/0126352 A1 | 6/2005 | Suh et al. | |
| 2005/0209730 A1 * | 9/2005 | Grund | G05B 19/4067 700/186 |
| 2005/0234586 A1 * | 10/2005 | Agapiou | G05B 19/41875 700/159 |
| 2005/0246052 A1 | 11/2005 | Coleman et al. | |
| 2005/0251284 A1 * | 11/2005 | Balic | G05B 19/4099 700/182 |
| 2005/0256604 A1 | 11/2005 | Diehi et al. | |
| 2006/0167668 A1 * | 7/2006 | Cariveau et al. | 703/7 |
| 2006/0291969 A1 | 12/2006 | Koch | |
| 2007/0091094 A1 * | 4/2007 | Hong | G05B 19/41 345/474 |
| 2008/0058982 A1 | 3/2008 | Gray | |
| 2008/0107491 A1 * | 5/2008 | Osburn | 408/139 |
| 2008/0235641 A1 | 9/2008 | Allen | |
| 2008/0269943 A1 | 10/2008 | Diehl et al. | |
| 2009/0312993 A1 * | 12/2009 | Drumheller | B29C 70/386 703/2 |
| 2010/0017762 A1 | 1/2010 | Monkowski et al. | |
| 2010/0087949 A1 * | 4/2010 | Coleman | G05B 19/40937 700/189 |
| 2010/0260569 A1 | 10/2010 | Ham et al. | |
| 2010/0274381 A1 * | 10/2010 | Gray | G05B 19/4097 700/181 |
| 2011/0150592 A1 | 6/2011 | Diehl et al. | |
| 2011/0169828 A1 * | 7/2011 | Pedersen | G06T 17/20 345/423 |
| 2011/0251715 A1 | 10/2011 | Diehl et al. | |
| 2012/0160635 A1 * | 6/2012 | Ooe | B62D 65/18 198/576 |
| 2012/0290271 A1 * | 11/2012 | Diguet | G06F 17/50 703/1 |
| 2013/0030562 A1 | 1/2013 | Sherbrooke et al. | |
| 2013/0144426 A1 | 6/2013 | Sherbrooke et al. | |
| 2014/0297021 A1 | 10/2014 | Aggarwal et al. | |
| 2016/0187869 A1 | 6/2016 | Sherbrooke et al. | |

OTHER PUBLICATIONS

Li et al., titled, "Tool Path Generation for Trianglular Meshes Using Least-Squares Conformal Map", 2011, Taylor & Francis, pp. 3653-3667.*

Jeong et al., "Tool Path Generation for Machining Free-Form Pockets Using Voronoi Diagrams," The International Journal of Advanced Manufacturing Technology, vol. 14, Issue 12, 1998, pp. 876-881.

"Adaptive Clearing: The missing strategy for ; roughing," <www.freesteel.co.uk>, 2 pages, May 7, 2000.

Brandt, et al., "Continuous Skeleton Computation by ; Voronoi Diagram," CVGIP: Image Understanding, May 1992, pp. 329-338, vol. 55, No. 3.

Choy, et al., "A corner-looping based tool path for pocket ; milling," Computer-Aided Design, Feb. 2003, pp. 155-166, vol. 35, No. 2.

Elber, et al., "MATHSM: Medial Axis Transform toward ; High Speed Machining of Pockets," Dec. 31, 2003, ; 16 pages.

Held, et al., "A smooth spiral tool path for high speed ; machining of 2D pockets," Computer-Aided Design, ; Jul. 2009, pp. 539-550, vol. 41, No. 7.

Held, et al., "Pocket machining based on contour-parallel ; tool paths generated by means of proximity maps," ; Computer-Aided Design, Mar. 1994, pp. 189-203, ; vol. 26, No. 3.

Held, M., "Appendix A, Bibliography," On the Computational Geometry of Pocket Machining, 1991, pp. 147-180, Springer-Verlag, Germany.

Held, M., "Chapter 1: Introduction," On the Computational ; Geometry of Pocket Machining, 1991, pp. 1-16, ; Springer-Verlag, Germany.

Held, M., "Chapter 10: Generating the Tool Path," On the Computational Geometry of Pocket Machining, 1991, pp. 139-146, Springer-Verlag, Germany.

Held, M., "Chapter 2: Survey of Contour-parallel Milling," On ; the Computational Geometry of Pocket Machining, 1991, ; pp. 17-36, Springer-Verlag, Germany.

Held, M., "Chapter 3: Survey of Direction-parallel Milling," On the ; Computational Geometry of Pocket Machining, 1991, pp. 37-52, Springer-Verlag, Germany.

Held, M., "Chapter 4: Preliminaries," On the Computational ; Geometry of Pocket Machining, 1991, pp. 53-60, ; Springer-Verlag, Germany.

Held, M., "Chapter 5: Computing Voronoi Diagrams," On the ; Computational Geometry of Pocket Machining, 1991, pp. 61-88, Springer-Verlag, Germany.

Held, M., "Chapter 6: Implementation Issues," On the Computational Geometry of Pocket Machining, 1991, pp. 89-101, Springer-Verlag, Germany.

Held, M., "Chapter 7: the Concept of Monotonous," On the ; Computational Geometry of Pocket Machining, 1991, pp. 103-114, Springer-Verlag, Germany.

Held, M., "Chapter 8: Generating the Tool Path," On the Computational Geometry of Pocket Machining, 1991, pp. 115-126, Springer-Verlag, Germany.

Held, M., "Chapter 9: Constructing the Mesh," On the Computational Geometry of Pocket Machining, 1991, pp. 127-137, Springer-Verlag, Germany.

Held, M., "Foreward, Table of Contents," On the ; Computational Geometry of Pocket Machining, 1991, ; 10 pages, Springer-Verlag, Germany.

Ibaraki, et al., "Tool Path Planning Using Trochoid Cycles for Hardened Steel in Die and Mold Manufacturing (1st Report), Tool Path Generation for Trochoid Cycles Based on Voronoi Diagram," Advances in Agile Manufacturing—ICAM 2003, 2003, pp. 435-442, China Machine Press.

(56) References Cited

OTHER PUBLICATIONS

Kramer, Thomas R., "Pocket Milling with Tool ; Engagement Detection," cover page and pp. 1-16, Apr. 4, 1991.

Lambregts, et al., "An efficient automatic tool path generator for 2½ D free-form pockets," Computers in Industry, Aug. 1996, pp. 151-157, vol. 29, No. 3.

Persson, H., "NC machining of arbitrarily shaped pockets," Compter-Aided Design, May 1978, pp. 169-174, vol. 10, No. 3.

Salman, et al., "Voronoi diagram-based tool path compensations for removing uncut material in 2½ D pocket machining," Computer-Aided Design, Mar. 2006, pp. 194-209, vol. 38, No. 3.

Stori, et al., "Constant Engagement Tool Path ; Generation for Convex Geometries," J. Mfg. Systems, 19:3; ABI/INFORM Global 2000.

Tsai, et al., "Operation Planning Based on Cutting Process Models," Annals of the CIRP, 1991, pp. 95-98, vol. 40, No. 1.

Vona, et al., "Voronoi toolpaths for PCB mechanical etch: Simple and intuitive algortihms with the 3D GPU," Proceedings of the 2005 IEEE International Conference on Volume, Apr. 2005, 8 pages.

Wang, et al., "A Metric-Based Approach to 2D Tool-Patah Optimization for High-Speed Machining," 9 pages.

Yamaji, et al., "Tool Path Planning Using Trochoid Cycles for Hardened Steel in Die and Mold Manufacturing (2nd Report), Tool Path Planning to Avoid an Excessive Tool Load," Advances in Agile Manufacturing—ICAM 2003, 2003, pp. 443-450, China Machine Press.

Yao, Z., "A Novel Cutter Path Planning Approach to High Speed Machining," Computer-Aided Design & Applications, 2006, pp. 241-248, vol. 3, Nos. 1-4.

Notice of Allowance for U.S. Appl. No. 12/575,333, Applicant: Glenn Coleman, dated Jul. 13, 2012, 9 pages.

Final Office Action for U.S. Appl. No. 12/575,333, Applicant: Glenn Coleman, dated May 1, 2012, 9 pages.

Non-Final Office Action for U.S. Appl. No. 12/575,333, Applicant: Glenn Coleman, dated Oct. 6, 2011, 15 pages.

International Search Report and Written Opinion for International Patent Application No. PCT/US13/39507, Applicant: Celeritive Technologies, Inc., dated Sep. 23, 2013, 9 pages.

European Supplemental Search Report for EP13784689, Applicant: Celeritive Technologies, Inc., dated Jun. 2, 2016, 12 pages.

Klocke et al., "Integrated Approach for Knowledge-Based Process Layout for Simultaneous 5-Axis Milling of Advanced Materials," Hindawi Publishing Corporation, vol. 52, No. 2, Jan. 1, 2011, 7 pages.

Sinumerik-Hindawi, "Milling with Sinumerik Mold Making with 3 to 5-axis simultaneous milling," Siemens AG, Feb. 16, 2012, 129 pages.

Lai et al., "Incremental algorithms for finding the offset distance and minimum passage width in a pocket machining toolpath using Voronoi technique," Journal of Materials Processing Technology, 100, 2000, 6 pages.

\* cited by examiner

HIGH PERFORMANCE MULTI-AXIS MILLING

CROSS-REFERENCE TO RELATED APPLICATION

This application claims the benefit of U.S. Provisional Application No. 61/642,317, filed May 3, 2012, which is incorporated herein by reference in its entirety.

BACKGROUND

Numerically controlled (NC) milling involves various techniques for removing material ("milling" or "cutting") from a workpiece to create an object of a particular shape and with defined dimensions. In NC milling, a milling machine or machine tool generally drives one or more cutting tools along a programmed path, known as a toolpath. By driving the cutting tool or tools along the toolpath, the workpiece is transformed from some initial state (the "initial workpiece") to a final state (the "final workpiece").

Machine tools are often classified according to the number of degrees of freedom, or axes, along which a cutting tool can be driven. FIG. 1 is an angled-view schematic diagram illustrating an example of a machine tool 100. The machine tool 100 may be able to move a cutting tool 108 up and down along a vertical axis 106, and at the same time move a table 110 holding a workpiece (not illustrated) along two horizontal axes 102 and 104, making it a 3-axis machine tool. A 3-axis toolpath intended for such a machine might include a series of x, y, and z coordinates which instruct the machine tool to move accordingly along the horizontal and vertical axes.

More advanced machine tools include not only linear axes such as the horizontal and vertical axes just described, but also rotational axes which control the orientation of the tool with respect to the workpiece. FIG. 2 is an angled-view schematic diagram illustrating an example of a 5-axis milling machine tool 200. In addition to the two horizontal linear axes 202 and 204 (the x-axis and the y-axis, respectively), and a single vertical linear axis 206 (the z-axis), the machine 200 might enable a workpiece (not illustrated) to rotate 208 around the z-axis and the cutting tool 212 to rotate 210 around the x-axis. Adding the two rotary axes 208 and 210 to the three linear axes 202, 204, and 206 makes it a 5-axis machine tool. A 5-axis toolpath running on such a machine tool may vary both the cutter position and the angle of the cutter with respect to the workpiece.

Different machine tools may have more linear or rotational axes, and the axes may be configured in different ways. For example, instead of rotating 208 the workpiece on a table as in FIG. 2, the cutting tool 212 might be held in a robot arm that can rotate around two different axes. However, in general, when there are both linear and rotational degrees of freedom present in a toolpath, it is referred to by the industry as a multi-axis toolpath. Driving a cutting tool along a multi-axis toolpath is known as multi-axis milling. Regardless of the actual kinematics of the machine tool, it is often easier to think of the workpiece as being fixed and the cutter moving and tilting around the workpiece. FIG. 3 is a side-view schematic diagram illustrating a milling cutter tool 300 tilted at an angle with respect to the vertical. The location of the cutter tip 302 is specified by (x, y, z) coordinates, and the direction of the cutter axis 304 is defined by a unit vector (i, j, k). This convention is adopted herein.

Multi-axis milling is widely used in industry, but it is often time-consuming to create multi-axis toolpaths, and difficult to create multi-axis toolpaths that remove large amounts of material efficiently. As a result, much of the material is commonly removed from a workpiece using 3-axis motion (in which the rotational axes are kept fixed) and afterwards a sequence of multi-axis toolpaths can be used to remove the material that the 3-axis motion could not reach. Unfortunately, creating this sequence of toolpaths is often time-consuming, and the multi-axis toolpaths themselves are often inefficient, largely because the 3-axis motion that removes the bulk of the material leaves behind material that does not closely represent the net shape of the part, which leaves uneven amounts of material to be removed with the multi-axis toolpaths.

Much of the difficulty in creating multi-axis toolpaths is due to the challenging problem of determining the tool axis vectors (i, j, k) at each point along the toolpath. One possible choice is to make the tool axis direction parallel to the surface normal as the cutter moves along the workpiece. This is sometimes referred to as "end-cutting." FIG. 4 is a side-view diagram illustrating a milling cutter performing a multi-axis end-cutting operation by keeping the tool axis normal to the curved surface of the workpiece 402 at positions 404a and 404b. A variation on this scheme is to set the tool axis vector at a fixed lead or lag angle to the normal as it moves along a toolpath. Another choice is to set the tool axis direction so that the side of the tool is parallel to a wall of the workpiece. Such an operation is referred to as "flank milling" or "swarf milling." FIG. 5 is an angled-view diagram illustrating a milling cutter performing a multi-axis flank milling operation by keeping the tool axis in the tangent plane of the curved wall 502 of the workpiece. Flank milling can be effective in forming the final shape of the part walls, as a large portion of the cutter is actively engaged in the material, but the tilt of the cutter may change suddenly as the cutter moves along the wall, since the tilt of the tool parallel to the wall is often strongly influenced by preceding and subsequent wall surfaces. These sudden changes in rotation lead to undesirable machining conditions. In the common case where tool motion to remove material away from the walls is generated by duplicating and offsetting the motion along the walls, these undesirable machining conditions can be replicated and even magnified.

Many previous inventions have considered the problem of removing material efficiently using 3-axis motion (see, e.g., U.S. Pat. No. 7,451,013 and U.S. Pat. No. 8,295,972), the disclosures of which are incorporated herein by reference. This type of motion can be converted to multi-axis motion by, for example, projecting it onto a curved surface and setting the tool axis vectors normal to the surface. However, what is missing is the ability to set the tool axis vectors based on other criteria, e.g., the tilt of the workpiece walls. Such a solution offers the ability to remove material rapidly and efficiently, saving machining time and part programming time.

DETAILED DESCRIPTION

A high performance milling technology ("the described technology") is described. The described technology enables milling areas of a part so that more aggressive machining parameters can be used in the toolpath than are typical, thereby resulting in reduced machining time and load. The described technology additionally determines directions of the tool axis vector at points along a toolpath to achieve a desired part shape while optionally maintaining high material removal rates.

Some embodiments of the described technology are described below. However, the described technology can be implemented in other embodiments as would be recognized by one skilled in the art.

First Embodiment

A portion of a workpiece may be milled using a multi-axis toolpath in which the tool axis vector direction is constrained at one or more points. This can be performed by (1) creating a domain mapping based on the workpiece; (2) defining one or more constraints on the tool axis vector; (3) defining a function to determine the tool axis vector such that the one or more constraints are satisfied; (4) setting the tool axis vector direction at one or more points along a toolpath using the defined function; and (5) outputting instructions based on the toolpath to control the operation of a milling machine.

Figure 1:
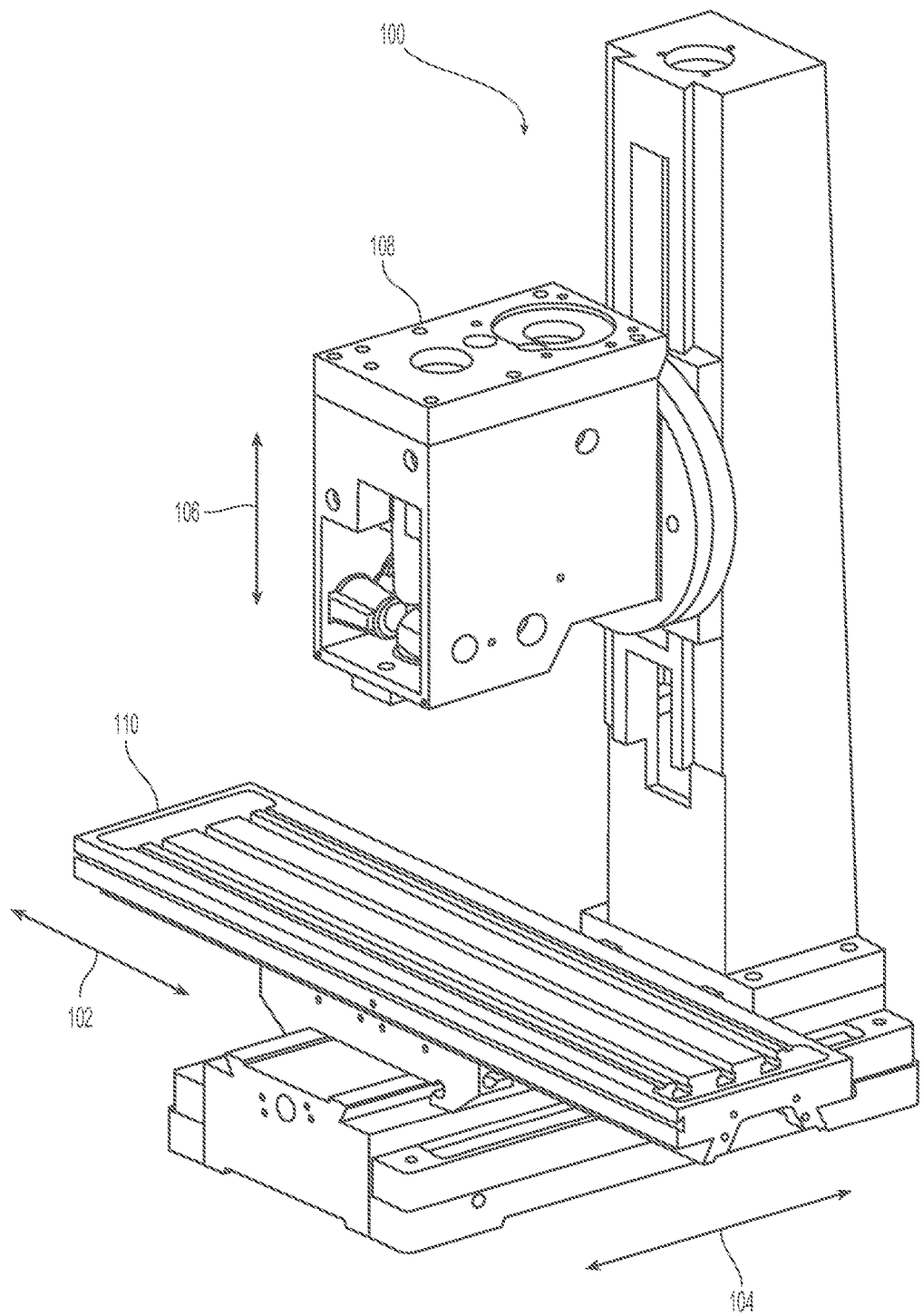
FIG. 1 is an angled-view schematic diagram illustrating a simple model of a 3-axis milling machine tool.
Figure 2:
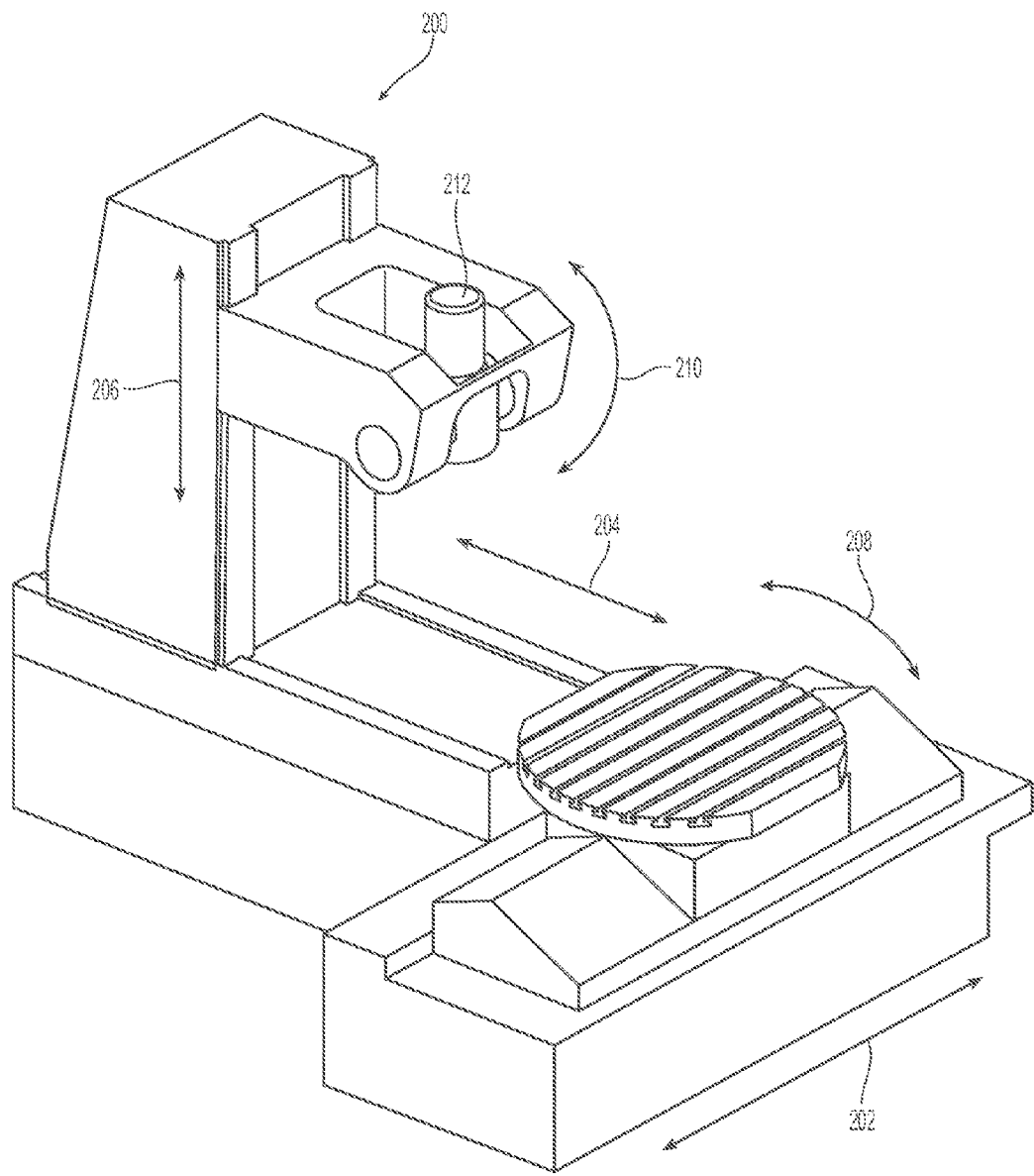
FIG. 2 is an angled-view schematic diagram illustrating a simple model of a 5-axis milling machine tool.
Figure 3:
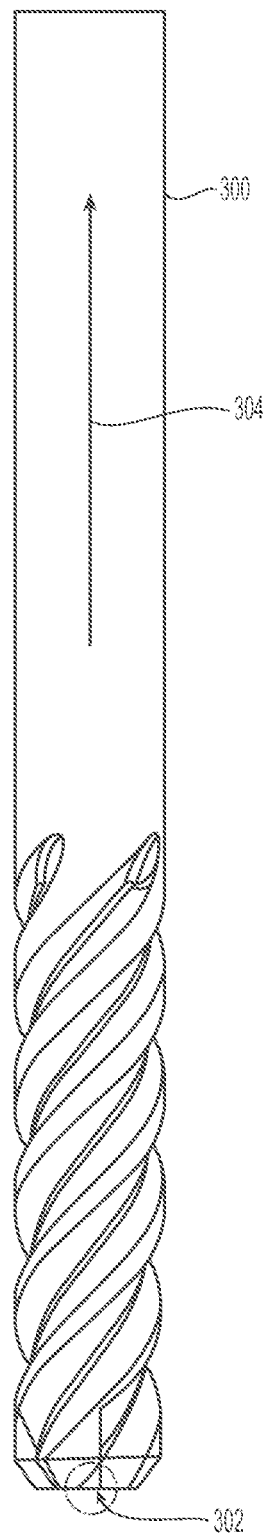
FIG. 3 is a side-view schematic diagram illustrating a milling cutter tool tilted at an angle with respect to the vertical.
Figure 4:
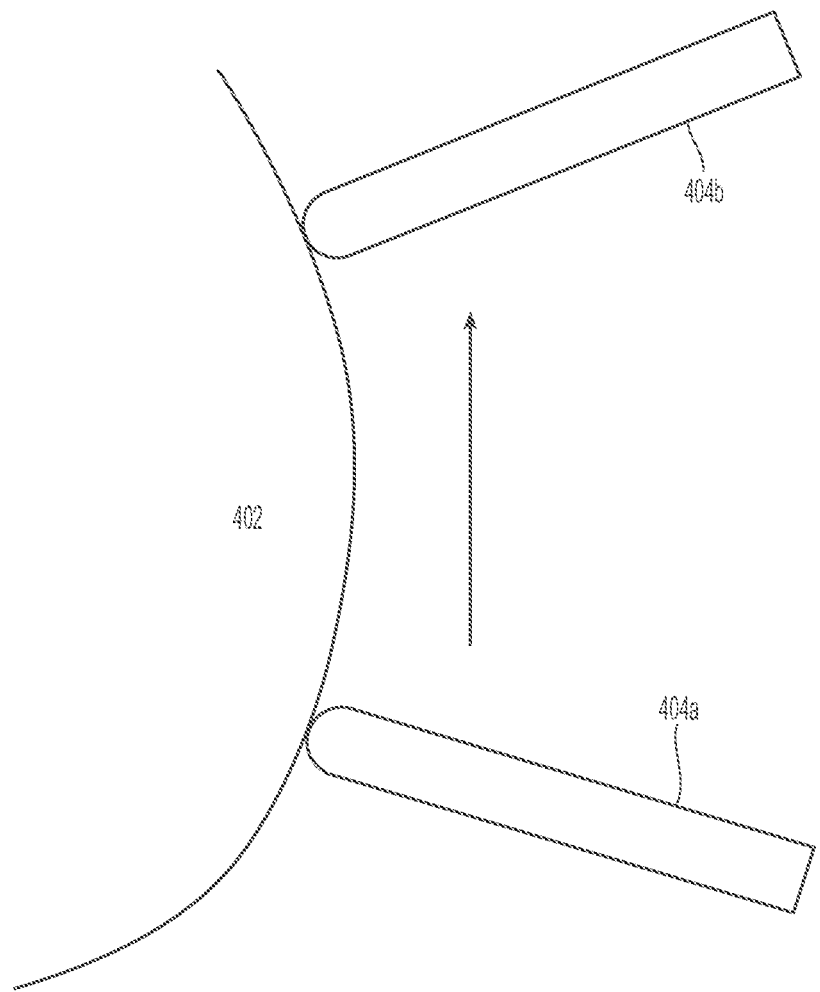
FIG. 4 is a side-view diagram illustrating a milling cutter performing a multi-axis end-cutting operation by keeping the tool axis normal to the curved surface of the workpiece.
Figure 5:
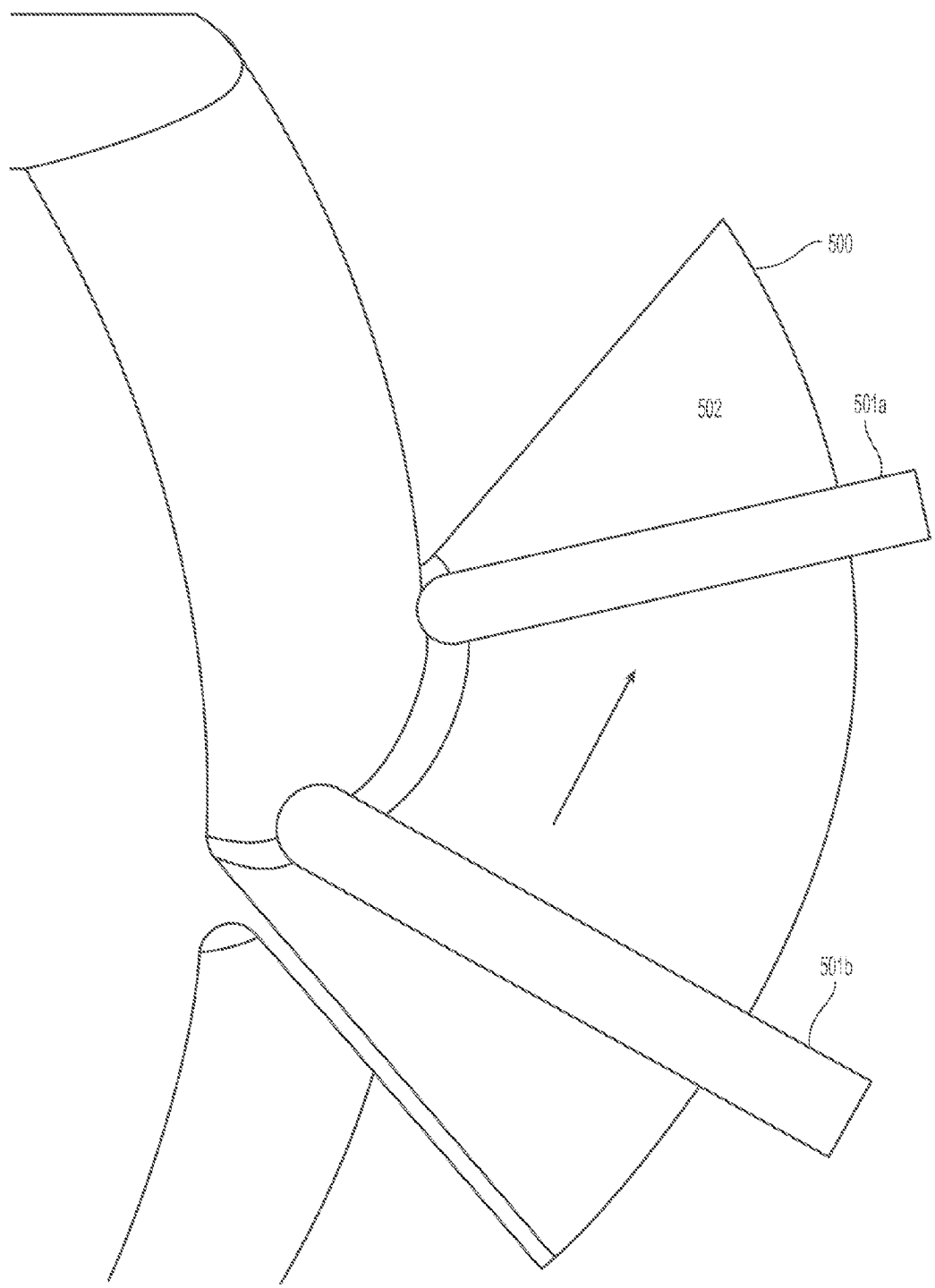
FIG. 5 is an angled-view diagram illustrating a milling cutter performing a multi-axis flank milling operation by keeping tool axis in the tangent plane of the curved wall of the workpiece.
Figure 6:
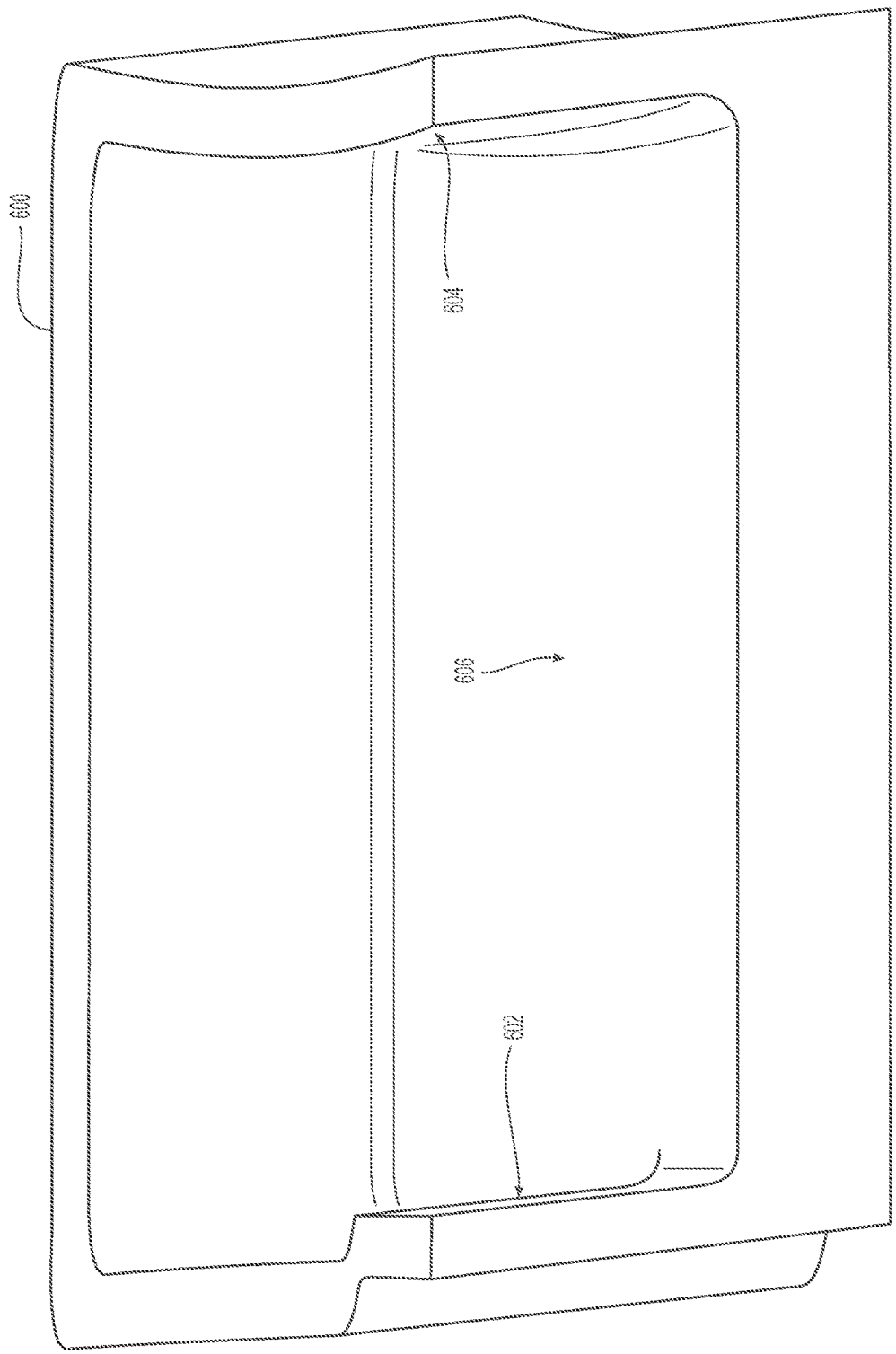
FIG. 6 is an angled-view diagram illustrating a finished workpiece (e.g., a part) with side walls tilted at an angle with respect to the vertical.

FIG. 6 is an angled-view diagram illustrating a finished workpiece 600 with side walls 602 and 604 that are tilted at an angle with respect to a vertical axis. Walls 602 and 604 are both tilted in one direction. A high performance multi-axis toolpath can be created that changes the tool angle smoothly everywhere so that the walls of the workpiece have the desired shape after cutting along the multi-axis toolpath. Because of the smooth change to the tool angle and the smooth, controlled cutter path, the cutter can be driven at a high feedrate along the toolpath, resulting in a high material removal rate.

Preferably, a two-dimensional ("2-D") domain mapping D can be created such that for any point $p=(x, y, z)$ in a subset of three-dimensional ("3-D") space, a 2-D point $p'=(u, v)$ can be obtained. A simple way of creating such a domain is via a planar projection mapping. In such a mapping, a 3-D point $p_0$ and two orthogonal vectors $U=(ux, uy, yz)$ and $V=(vx, vy, vz)$ in 3-D space are selected that span some desired plane. This plane can be referred to as a reference surface $S(u,v)$. Then the u and v coordinates of p' are simply $u=(p-p_0)*U$ and $v=(p-p_0)*V$. Other types of domain mappings are possible as well, such as projection to a reference surface like a cylinder or a sphere, or more complicated domain mappings found in the art. A good domain mapping should try to minimize the distortion between 2-D and 3-D. Ideally, for two points $p_0'$ and $p_1'$ in the domain, there should be two points in 3-D $p_0$ and $p_1$ such that $D(p_0)=p_0'$ and $D(p_1)=p_1'$, and such that the distance between $p_0'$ and $p_1'$ in the domain is approximately equal to the distance between $p_0$ and $p_1$ in 3-D. It is generally not possible to make the distances equal for every point, but minimizing distortion in the mapping usually leads to better results. For the workpiece 600 illustrated in FIG. 6, for example, a plane containing the floor 606 can be selected and a planar domain mapping can be created using the plane of the floor as the reference surface.

Figure 7:
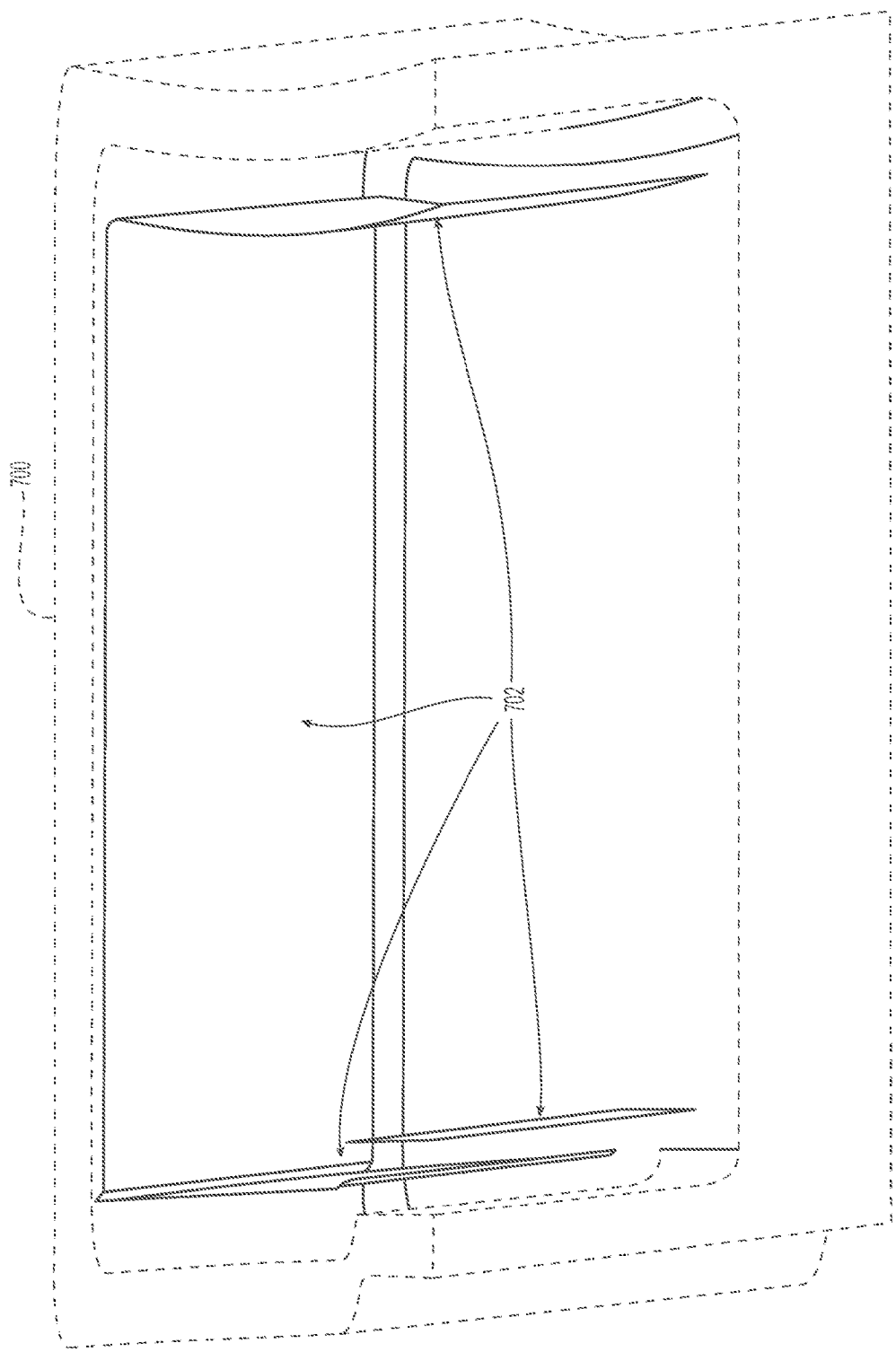
FIG. 7 is an angled-view diagram illustrating offset surfaces of the walls of the part from FIG. 6.
Figure 8:
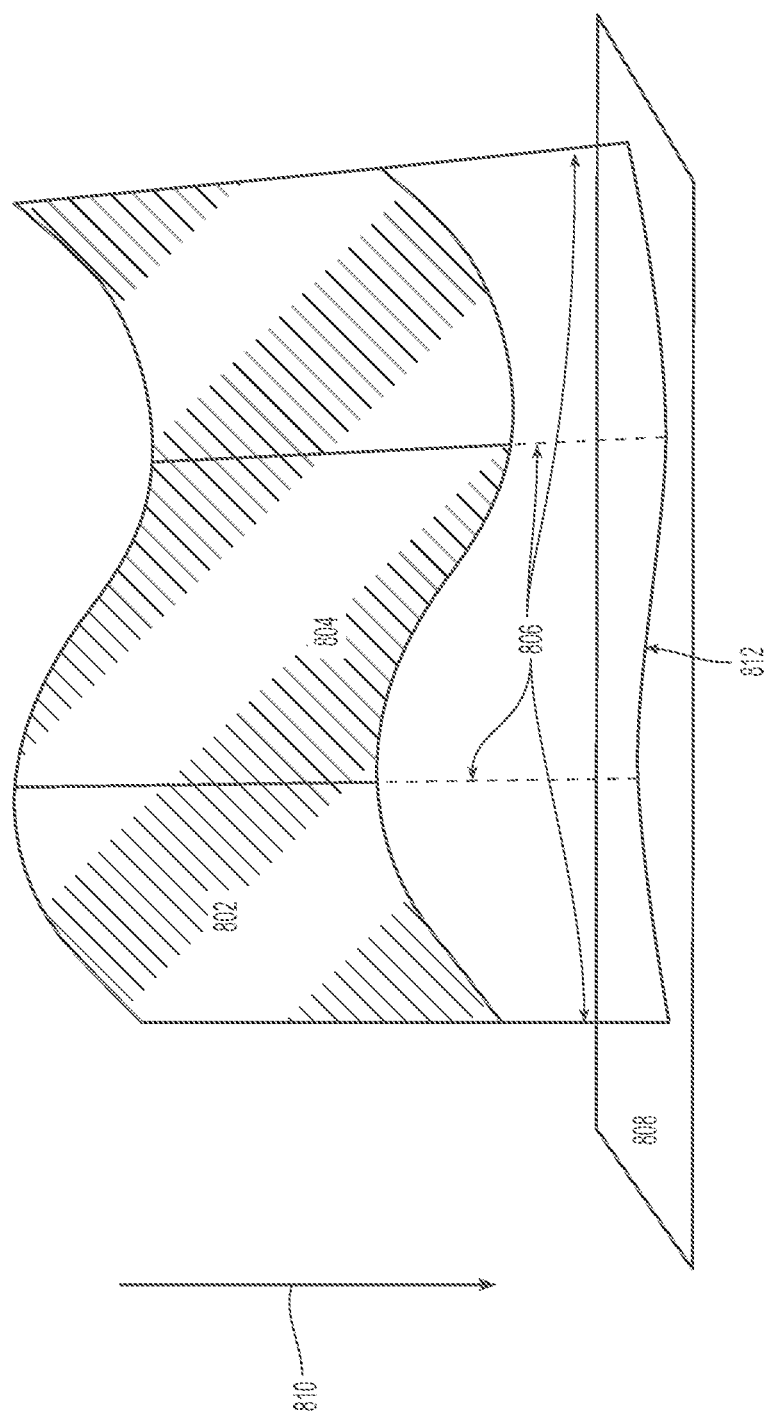
FIG. 8 is an angled-view diagram illustrating isoparametric lines on an offset surface intersecting a planar reference surface.

Once the domain mapping is created, constraint curves or points can be created in the domain. In various embodiments of the described technology, some of the constraint curves or points may be based on wall geometry. Referring to FIG. 7, which is an angled-view diagram showing offset surfaces of the walls of the part from FIG. 6, the technology can be used to select zero or more wall surfaces on a part 700 (the boundaries of which are illustrated in dashed lines) and create offset surfaces 702 (illustrated in solid lines) at an offset distance equal to the radius of a cutting tool (not illustrated). The offset surfaces may optionally be trimmed with respect to each other to remove overlaps and self-intersections, although this is not required. Then, the technology can extend the surfaces down to the reference surface and compute a series of intersection points between the extended surfaces and the reference surface. There are a number of ways to do this. The technology can extend the parametric domain of the offset surface until the surface intersects the reference surface, and then perform a surface-surface intersection to obtain intersection curves in the domain of the reference surface. An alternate embodiment is explained in reference to FIG. 8, which is an angled-view diagram illustrating isoparametric lines on an offset surface intersecting a planar reference surface. For each offset surface 802 the technology can create a series of isoparametric curves 804 on the offset surface 802 and extend those curves as necessary along tangents 806 at the curve endpoints until they intersect the reference surface 808. Of two possible parametric directions in the domain of the offset surface, the technology may choose the direction that provides isoparametric curves more closely aligned with the projection direction 810. The technology may then connect the intersection points on the reference surface, e.g., in sequence, to create a constraint curve 812 in the domain of the reference surface.

Figure 9:
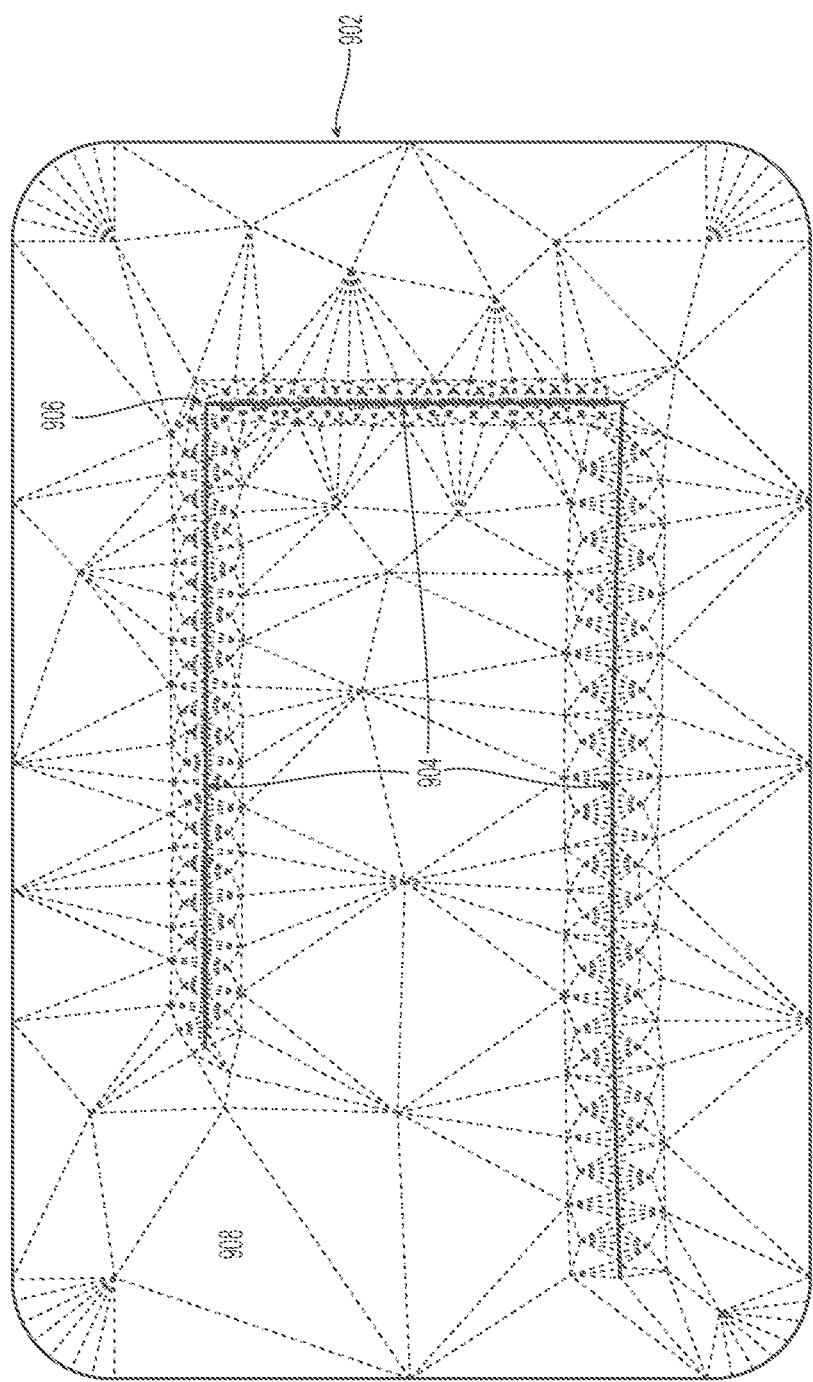
FIG. 9 is a plan-view diagram illustrating boundary curves, constraint curves, and a triangulated mesh inside a 2-D domain.

Preferably after creating constraint curves in the 2-D domain, the technology can create a triangular mesh around constraint curves that are suitable for the application of a finite element method. It will readily be appreciated by one skilled in the art that other techniques, e.g., a finite difference method, or other finite element types such as quadrilaterals could be used. FIG. 9 is a plan-view diagram illustrating boundary curves, constraint curves, and a triangulated mesh inside a 2-D domain. The technology may identify a boundary curve 902 in the 2-D domain outside constraint curves 904 (e.g., corresponding to constraint curves 812 described above in relation to FIG. 8). Although there is no practical restriction on the size of such a boundary, in a preferred embodiment the boundary is obtained by computing a bounding box around the projection of the workpiece into the domain and offsetting it outwards by at least the diameter of the cutting tool. Preferably, any intersections between constraint curves are detected, and the constraint curves are subdivided at intersection points, e.g., point 906. The technology may compute a finite element mesh 908, illustrated using dashed lines, within the boundary curve 902 around the constraint curves 904.

The technology may then employ a finite element method to create a function that defines the tool axis vector direction for points (e.g., any point) in the domain. Using the usual formulation of the finite element method, the technology can create a function $$F(u, v) = \sum_{j=1}^{m} w_j N_j(u, v),$$

where the unknown $w_j$ are 3-D points describing the degrees of freedom of the function and the $N_j$ are basis functions defined over the whole domain. The function $F(u,v)$ can be defined to return one end of a line segment that describes the tool axis vector direction at the point $(u,v)$ in the domain. The other end of the line segment is the 3-D location of the point $S(u,v)$ evaluated on the reference surface S. The tool axis vector direction can be obtained by defining $T(u,v)=F(u,v)-S(u,v)$ and then dividing $T(u,v)$ by its length to get a tool axis vector of magnitude equal to 1.

The technology may define the unknown degrees of freedom $w_1$ to be the result of evaluating F at each of the vertices $(u_j,v_j)$ of the finite element mesh constructed above, and define the basis functions $N_j$ such that $N_j=1$ at $(u_j,v_j)$, $N_j$ is piecewise linear when evaluated inside the triangles adjacent to $(u_j,v_j)$ in the mesh, and $N_j=1$ everywhere else. One skilled in the art would know that other choices of degrees of freedom and basis functions are possible, including basis functions that lead to higher orders of continuity in F and require more degrees of freedom, such as both position and partial derivatives at each of the vertices, or directional derivatives across the edges.

To determine the unknown degrees of freedom, the technology may compute an energy functional and attempt to minimize it, optionally with respect to a set of constraints. The energy functional approximately models the energy stored in a physical membrane (e.g., a membrane similar to a soap bubble) subjected to stretching forces. Similar energy functionals have been used in the art for curve and surface design (see, for example, U.S. Pat. No. 6,369,815, which is incorporated herein by reference). The technology may define the energy functional $E=E_{stretch}-E_{spring}$, where the $E_{stretch}$ term models energy due to stretching of the membrane from a neutral state, and the $E_{spring}$ term models energy stored in a series of ideal springs that act to pull the membrane in a direction normal to the reference surface. To simplify the problem, simple quadratic approximations can be used for both terms.

The technology may set $$E_{stretch} = \sum_{i=1}^{n} \int\int_{Ti} |F_u - S_u|^2 + |F_v - S_v|^2,$$

where the summation is taken over all triangles $T_1$, $T_2, \ldots, T_n$ in the triangulation. This energy would be zero if F were the same as the reference surface S, or at least could be projected onto S without any distortion. As F deviates from S, the stretch energy increases. This energy is integrated over each triangle $T_i$ separately, and then summed over all triangles to get a total energy. Because $F_u$ and $F_v$ are sums of derivatives of basis functions multiplied by various constant unknown $w_i$, it is possible to pull the $w_i$ terms outside the integrals. In the case of the simple piecewise linear basis functions described above, it is easy to compute the numerical values of the remaining terms inside each integral directly. For more complicated basis functions, a numerical integration method such as Gaussian quadrature can be employed.

The technology may also define a total spring energy $$E_{spring} = \sum_{i=1}^{m} k_i |w_i - p_i|^2$$

where $k_i$ is a spring constant, $p_i$ is a point in space preferably lying one unit away from $i^{th}$ vertex $S(u_i,v_i)$ along the surface normal at that vertex, and m is the number of vertices in the mesh. The springs attempt to pull the tool axis vector normal to the surface, and the spring constants determine how strongly they do so. The strength of the spring constants may be specified under user control or computed automatically. It is possible to make $k_i$ the same for every vertex in the mesh. Alternatively, the $k_i$ can be weighted by the total area of the triangles adjacent to the associated vertex so that more densely packed vertices get weaker springs. Although it is often desirable for the springs to be directed normal to the surface, this is not required; for example, a lead or lag angle with respect to the normal can easily be imposed by moving the $p_i$ away from the surface normal at specified angles.

The sum of the stretch and spring energies is a quadratic form in terms of the unknown degrees of freedom $w_i$. The technology may also enforce linear constraints based on the constraint curves described above. At each point in the mesh that lies on a constraint edge obtained from a wall offset surface, a constraint may require that $(w_j-s_j)\cdot n_j=0$, where $s_j$ is the known point on the reference surface corresponding to $w_j$, and $n_j$ is a normal to the offset wall surface obtained from the isoparametric curve that generated that point. Because the wall constraints are linear and E is quadratic, finding the desired $w_i$ by minimizing E subject to constraints reduces to the equality-constrained optimization problem of minimizing $x^T Q x + c^T x$ subject to $Ax=b$ where Q is a symmetric, positive definite matrix, A is a rectangular matrix, b and c are vectors of constant coefficients, and x is a vector of the unknown degrees of freedom $w_i$. Because Q and A are sparse, this problem can be solved either through direct matrix factorization methods or, preferably, through an iterative scheme such as the Preconditioned Conjugate Gradient method.

In addition to (or instead of) the wall surface normal constraints just described, additional spring constraints may be defined, or tool axis vector directions may be fixed and defined at certain locations. For example, it may be preferable to force the tool axis vector at one or more points along a wall to be parallel to a particular line, such as the line connecting the endpoints of a particular isoparametric curve on the wall. Or it may be desirable to give the tool a particular lead or lag angle as it cuts along a wall. In either case, a particular $w_i$ may be set to a fixed location, thus removing it as an unknown in the constrained linear system described above. Alternatively, the spring constraint point $p_i$ described above may be moved so that it lies along a desired line, and the spring constant $k_2$ may be significantly increased to ensure that the computed tool axis vector stays close to the line. In such cases, the tool may deviate slightly from the desired tool axis vector, but the tool axis vector function may behave more smoothly than if the vectors were completely fixed along the wall.

Figure 10:
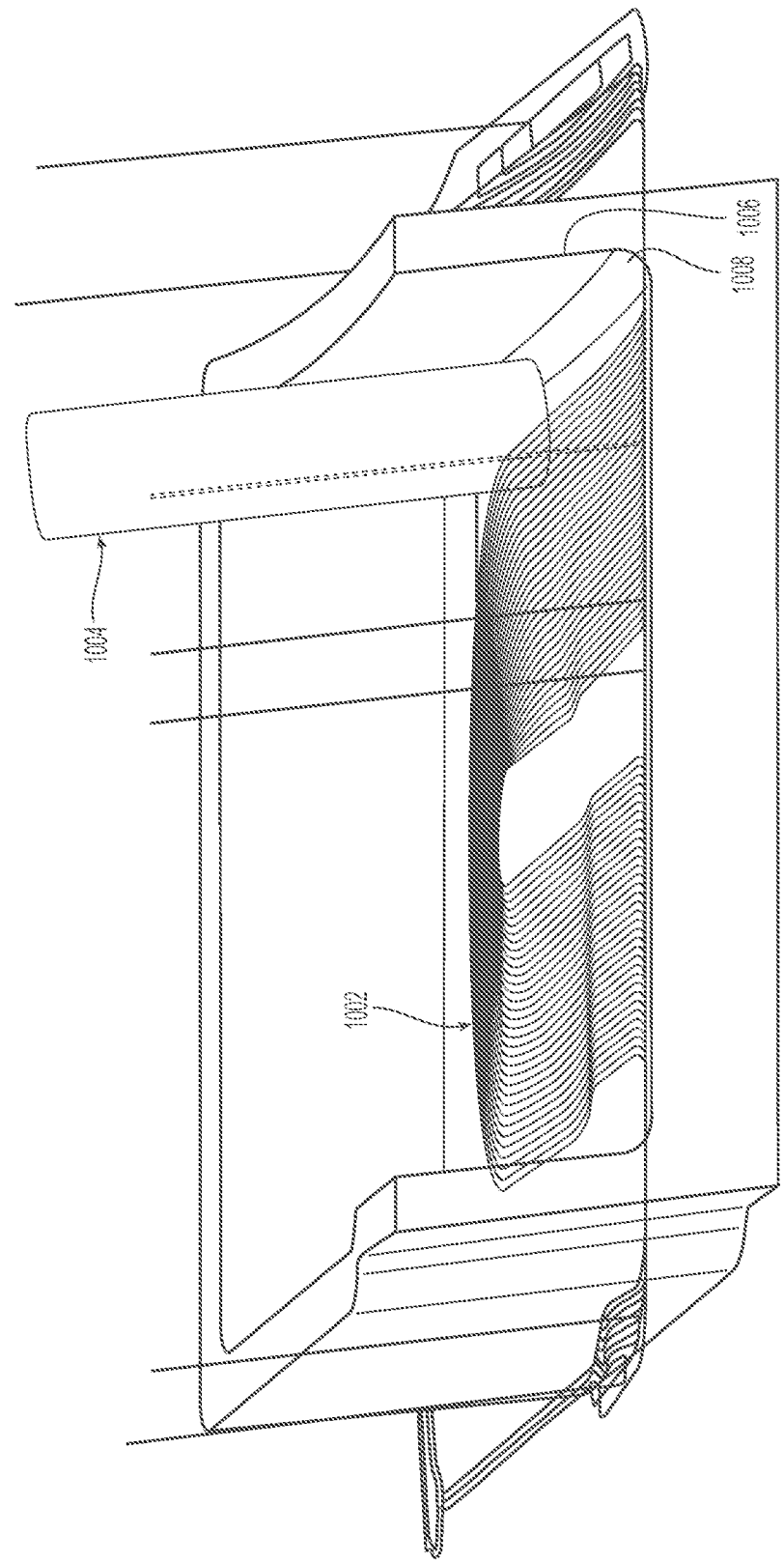
FIG. 10 is an angled-view diagram illustrating a high-performance toolpath on the part illustrated in FIG. 6 and a milling cutter moving along the toolpath.

With the degrees of freedom determined, the tool axis vector may now be evaluated anywhere in the domain as a sum of finite element basis functions multiplied by the degrees of freedom. Toolpaths mapped into or constructed inside the domain may therefore be assigned a tool axis vector anywhere along the toolpath. FIG. 10 is an angled-view diagram illustrating a high-performance toolpath on the part illustrated in FIG. 6 and a milling cutter moving along the toolpath. A portion of a high-performance toolpath 1002 is created for the part illustrated FIG. 6. The toolpath itself is created in a domain constructed from the plane containing the floor face, e.g., by using methods described in U.S. patent application Ser. No. 12/575,333, and then mapped back into 3-D. The tool axis vector, e.g., at each point along the toolpath, can be set using the function $F(u,v)$ described above, so that a cutting tool 1004 follows the wall 1006 closely and is able to reach material underneath the walls, e.g., region 1008, that cannot be reached in 3-axis cutting. The constraint equations can keep the tool tangent to the wall, but because the tool is free to tilt within the tangent plane, the energy minimization process keeps the change in tool axis vector direction smooth and gradual.

A multi-axis milling machine can be driven by instructions derived from such a toolpath. Because of the smoothness of the variation of the tool axis vector and because the described technology may be designed to work in conjunction with existing toolpath strategies (including high-performance toolpaths), the described technology enables high material removal rates and extended tool life.

Second Embodiment

In certain cases, such as when a portion of a workpiece has at least one curved floor surface, a high-performance multi-axis toolpath may be more easily generated in a 3-D space that is not a subset of actual real-world space, and then mapped into actual real-world space. This task can be accomplished by (1) defining a continuous, invertible mapping from a first subset of 3-D space to a second, different subset of 3-D space; (2) using the mapping to transform the workpiece; (3) computing a toolpath in the second subset of 3-D space based on the transformed workpiece; (4) transforming the toolpath using the inverse mapping into the first subset of 3-D space; and (5) outputting instructions based on the transformed toolpath to control the operation of a milling machine.

It is well understood in the prior art that a toolpath may be created in the 2-D parametric domain of a surface and then mapped, using the equation of the surface, to 3-D space, possibly also setting tool axis vectors based on the surface normal in the course of this mapping. The mapping is one-way, from a simple 2-D domain into 3-D.

Figure 11:
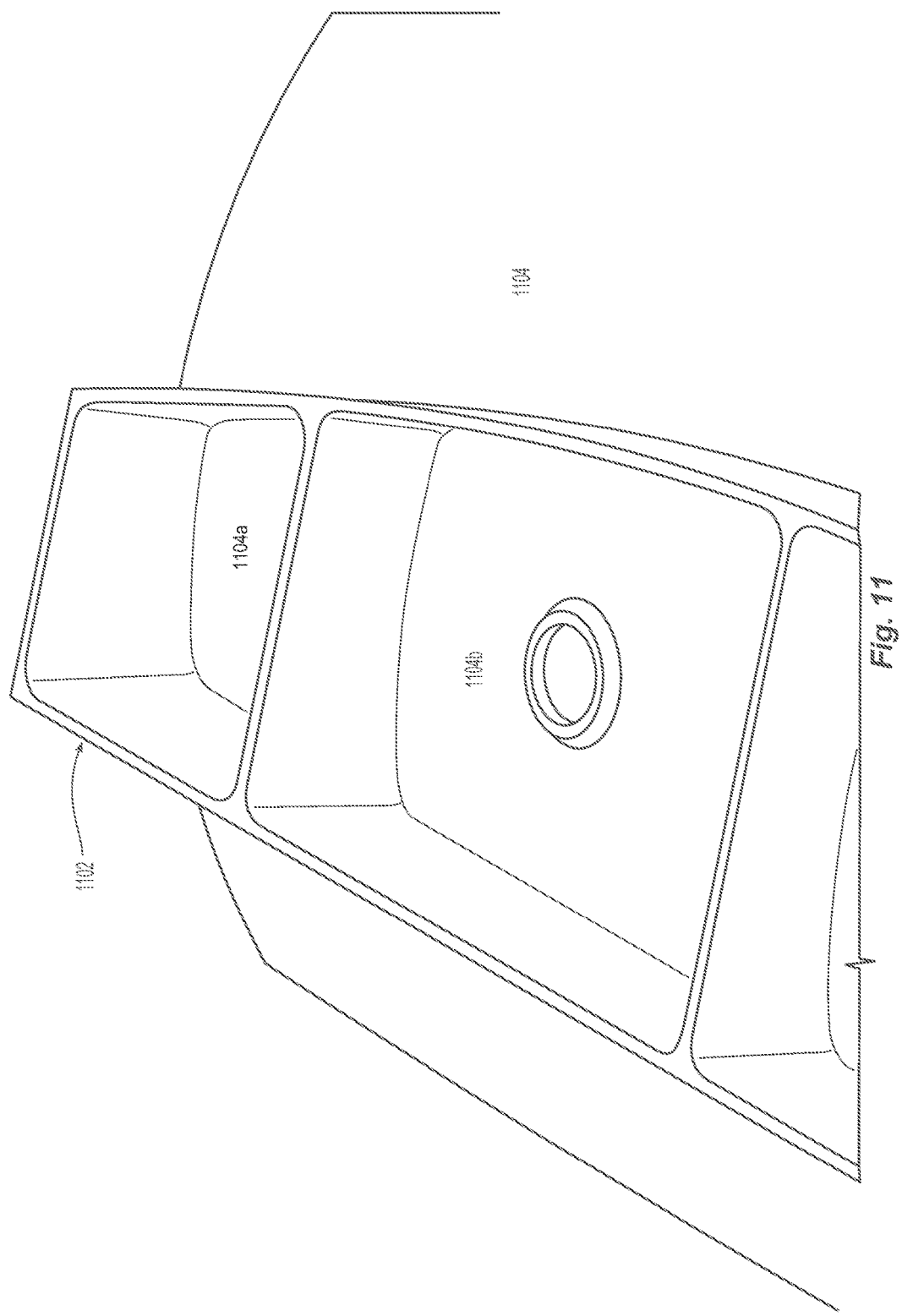
FIG. 11 is an angled-view diagram illustrating a workpiece with curved floors.

In the described technology, however, a continuous, invertible mapping is created from actual 3-D space to a different 3-D space, in which the workpiece itself is transformed, along with associated tool axis vector constraints such as the ones described in the First Embodiment, if any. Preferably, both the initial and final states of the workpiece are represented as separate geometries, and both are transformed. For example, the workpiece such as the one shown in FIG. 11 might be the final state of a workpiece that started as a simple rectangular block of metal; preferably, both the geometric representations of the rectangular block and the final workpiece will be transformed so that the starting and ending points of cutting passes in the transformed space can be accurately determined. After a toolpath is created in this transformed space, it is transformed back to actual space using the inverse of the mapping. Thus, unlike the prior art, the mapping is two-way, and both the mapping and its inverse are used.

More specifically, let $D:R^3 \rightarrow R^3$ be a continuous function whose inverse $D^{-1}$ is also continuous. Consider the workpiece 1102 in FIG. 11; the floors 1104a and 1104b of the pockets in this workpiece are parts of a single reference surface 1104. Preferably, D can be chosen such that when the workpiece is mapped using D, the reference surface 1104 will become planar in the mapped space. A toolpath cutting predominantly parallel to the planar surface can now be created in the mapped space, using either the methods of the First Embodiment or techniques of the prior art. $D^{-1}$ then maps this toolpath back to actual space, resulting in a toolpath that cuts along the floor surface 1104. Such a toolpath can additionally consist of multiple, parallel passes at different elevations in the mapped space, inducing multiple passes in actual space at different distances above the curved floor surface.

One skilled in the art will appreciate that D can be constructed in many different ways. In the presence of surfaces such as 1104, a simple choice is to compute a plane that best fits the reference surface and use it as a projection plane P. Then, for any point p=(x, y, z) in 3-D space, let z' be the signed distance from p to the floor, and let q be the closest point on the floor surface to p. Let x' and y' be the coordinates of q within the plane P after q is projected onto P. Then D(p)=p'=(x, y, z). As long as the floor surface is differentiable, this mapping will be continuous. Furthermore, the inverse mapping is easily obtained; for any mapped point p', simply create a ray normal to the plane P until it hits the floor surface at q. Then travel along the floor surface normal from q a distance equal to z' to arrive at p (if z' is negative, then travel backwards along the surface normal).

For parts whose floors are derived from surfaces of revolution, such as impellers or blisks, it may be preferable to use the parametric coordinates of the surface of revolution as the x' and y' coordinates instead of a projection plane. This technique works best when the parametric coordinates are relatively undistorted, i.e. when the distance between two points $p_1$ and $p_2$ is relatively close to the distance between the mapped points $D(p_1)$ and $D(p_2)$. More complicated mappings found in the art may also be suitable if they typically keep the amount of distortion small.

Figure 12:
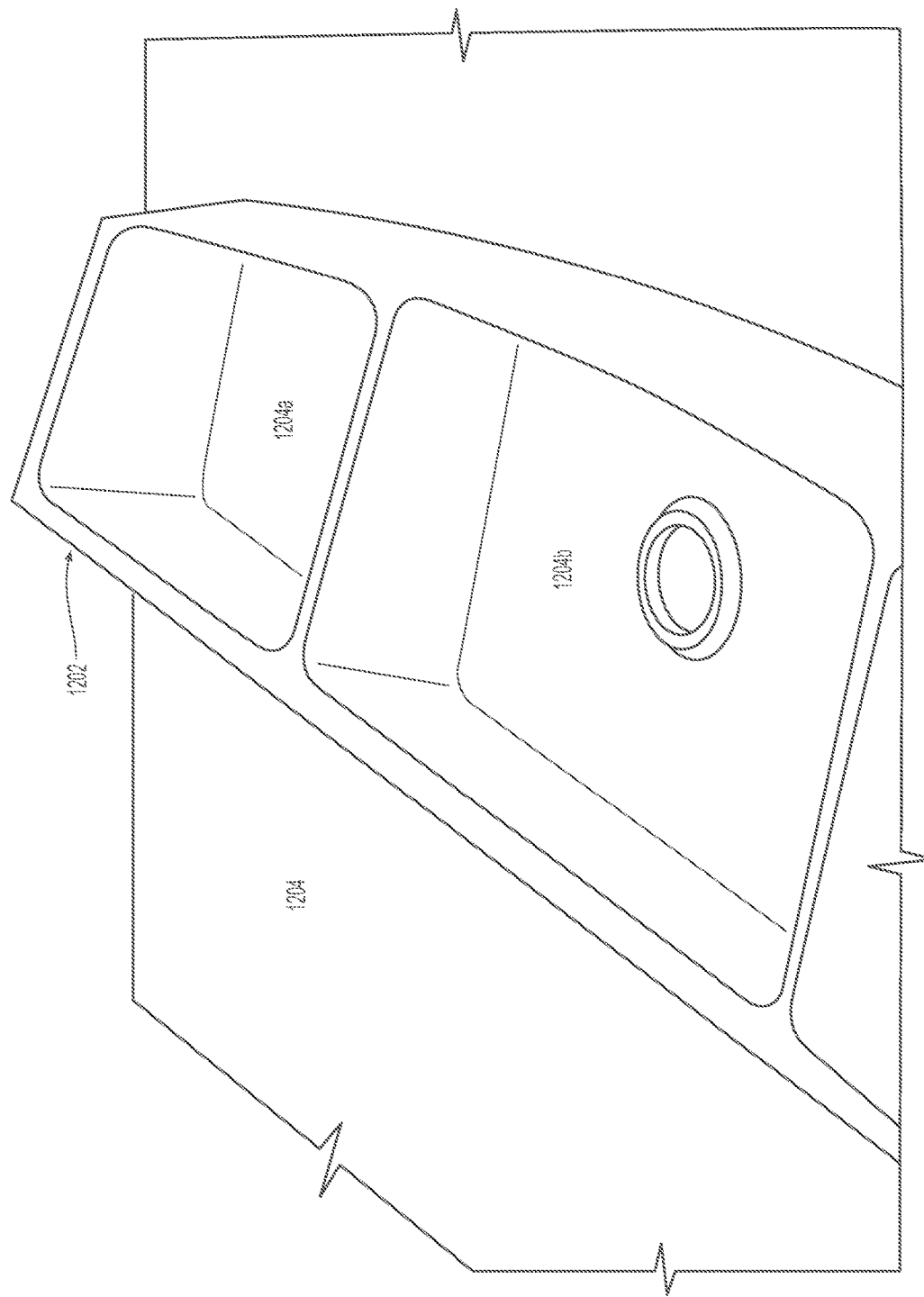
FIG. 12 is an angled-view diagram illustrating the result of mapping the workpiece of FIG. 11 into a space where the curved floors map to a planar surface.
Figure 13:
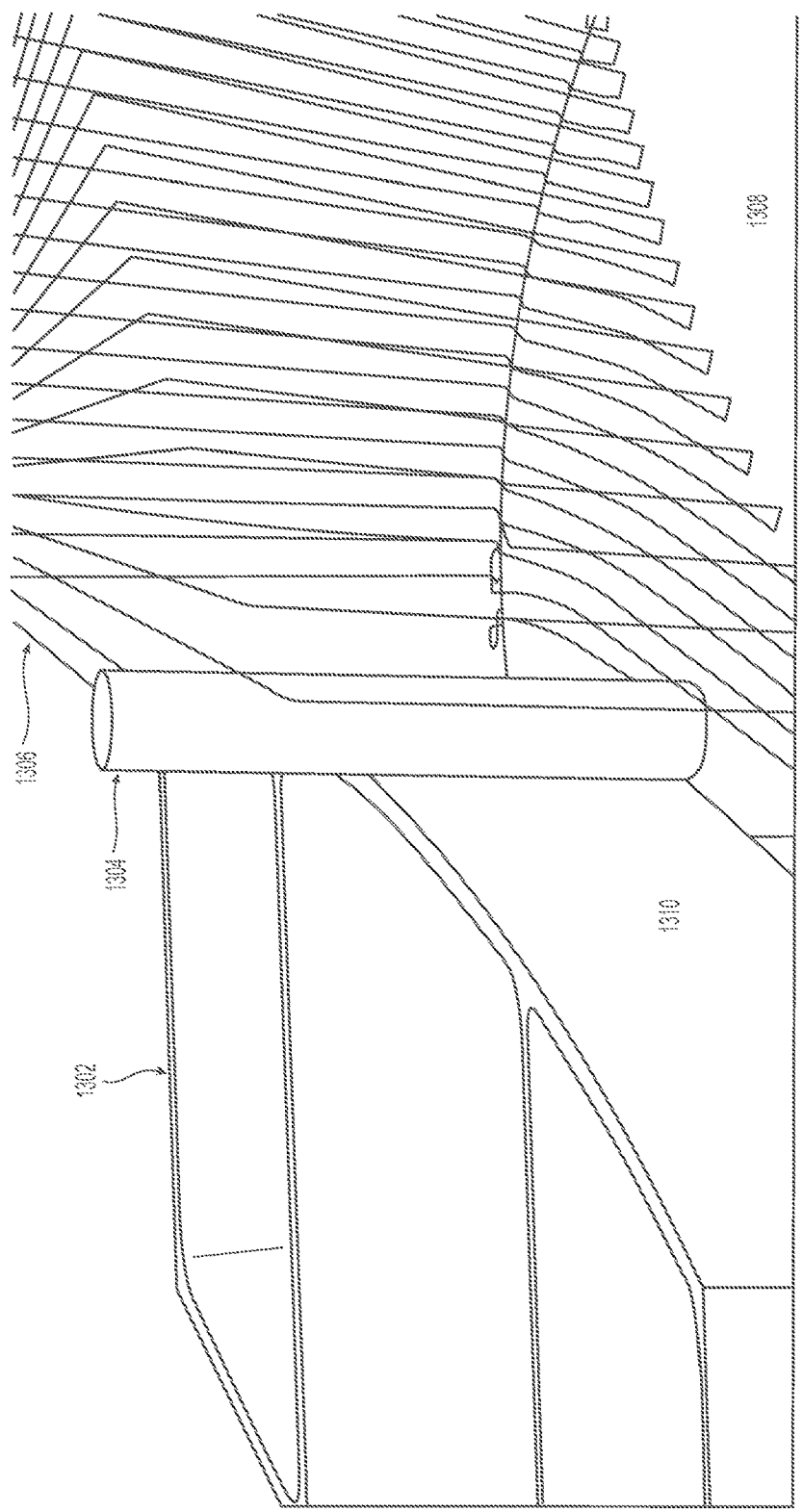
FIG. 13 is an angled-view diagram illustrating a high-performance toolpath on the workpiece of FIG. 11 and a milling cutter moving along the toolpath.

Referring now to FIG. 12, the workpiece 1102 has been transformed into the mapped workpiece 1202, and the floor surfaces 1104, 1104a, and 1104b have mapped to 1204, 1204a, and 1204b respectively. Optionally, the techniques of the First Embodiment can be used to enforce tool axis vector constraints on the mapped workpiece so that, for example, the tool will follow both walls and floor surfaces. FIG. 13 shows the result of generating a toolpath on the mapped workpiece of FIG. 12 and mapping it back to actual space. The workpiece 1302 is being cut by the cutting tool 1304 along the toolpath 1306. The tool travels along the curved floor 1308 and also tilts with respect to the wall 1310 by applying the methods described in the First Embodiment. Note that both the locations of the tool tip and the tool axis vector are mapped back using $D^{-1}$.

Aspects of the described technology involve machines including or interoperating with computing devices. The computing devices on which the described technology is implemented may include a central processing unit, memory, input devices (e.g., keyboard and pointing devices), output devices (e.g., display devices), and storage devices (e.g., disk drives). The memory and storage devices are computer-readable media that may be encoded with data structures and computer-executable instructions that implement the approval system, which means a computer-readable medium that contains the data structures and the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in and used with various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The described technology may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. As an example, various components or logic of the described technology may be distributed between a numerical control machine and a computing device that is communicably coupled to the numerical control machine, such as via a data communications network or other electronic or electromechanical interface.

Figure 14:
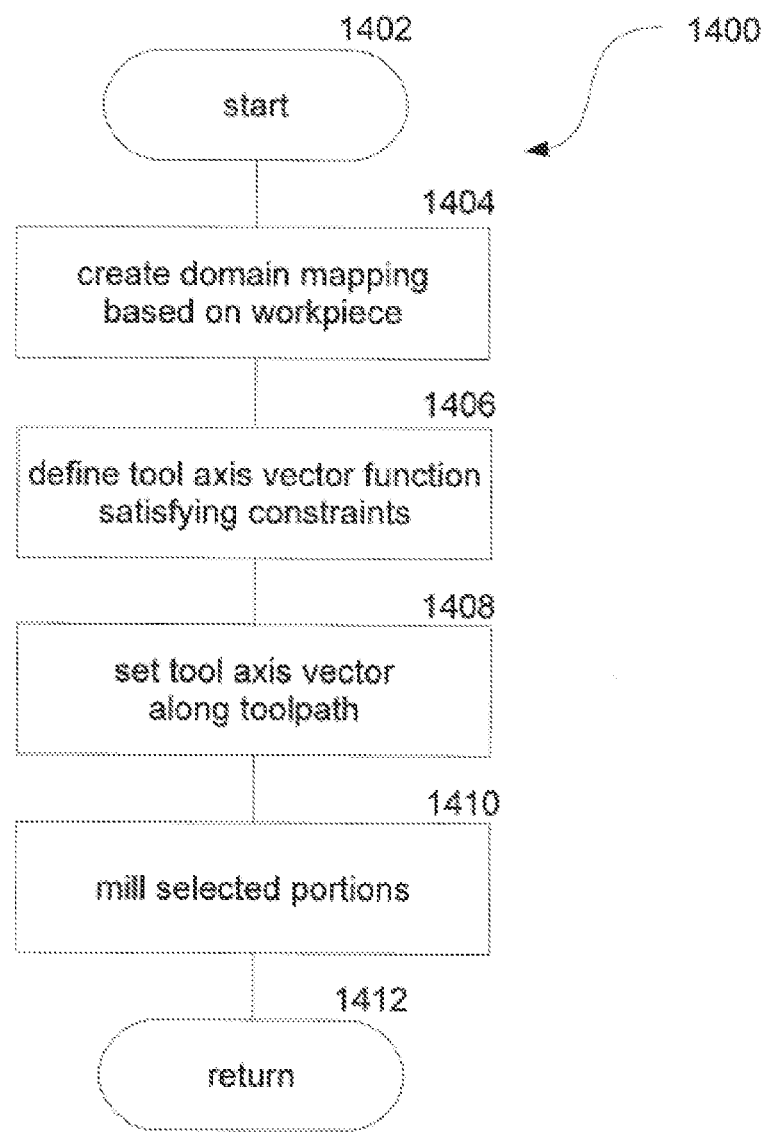
FIG. 14 is a flow diagram illustrating routines invoked during machining in various embodiments.

FIG. 14 is a flow diagram illustrating a routine invoked to create a toolpath in various embodiments. The routine begins at block 1402. At block 1404, the routine creates a domain based on a workpiece. At block 1406, the routine defines a tool axis vector function that may satisfy some set of constraints. At block 1408, the routine uses the tool axis vector function to set the tool axis vector at points along a toolpath. At block 1410, the routine causes the machine to mill selected portions of a workpiece, e.g., as defined by the toolpath. The routine returns at block 1412.

Figure 15:
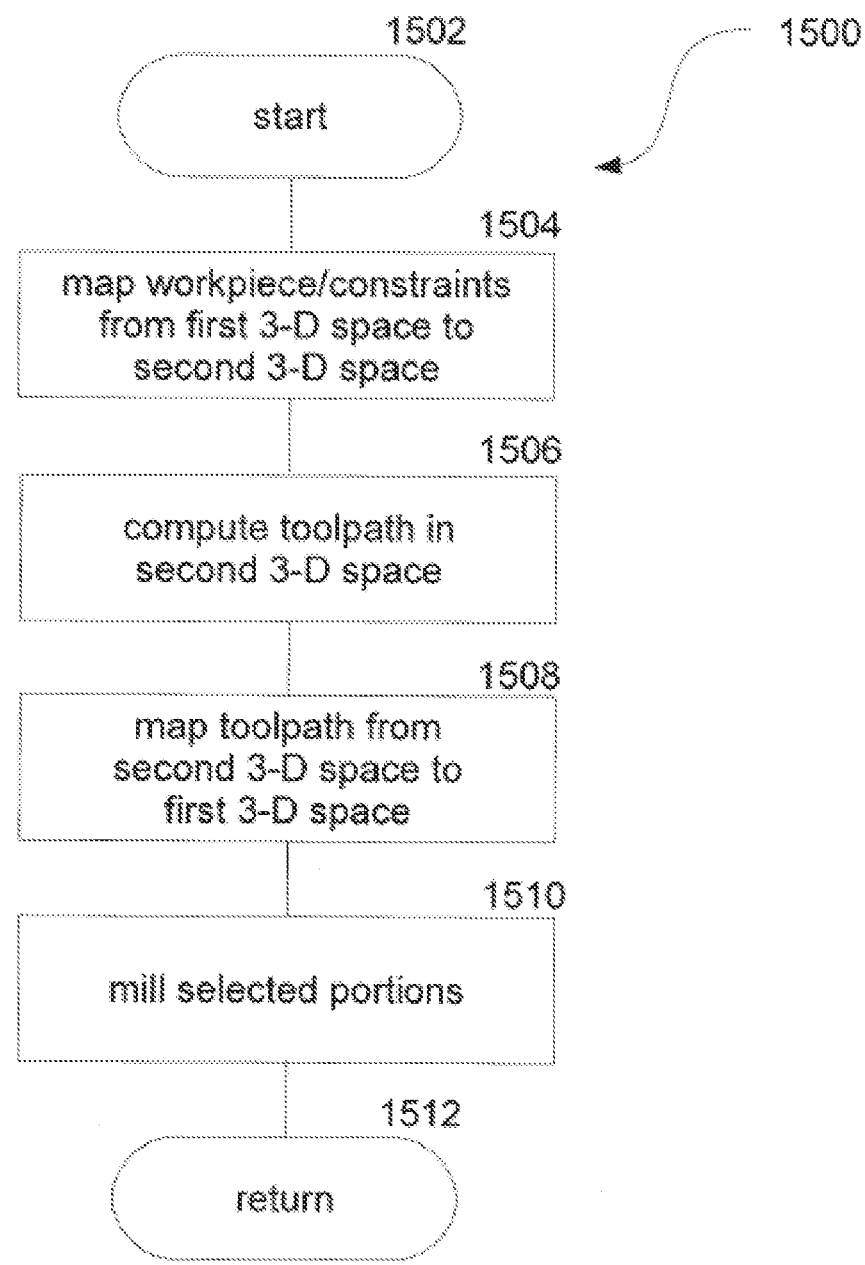
FIG. 15 is a flow diagram illustrating routines invoked during machining in various embodiments.

FIG. 15 is another flow diagram illustrating a routine invoked to create a toolpath in various embodiments. The routine begins at block 1502. At block 1504, the routine maps a workpiece and/or constraints from a first 3-D space representing the actual world to a second 3-D space. At block 1506, the routine computes a toolpath in the second 3-D space. At block 1508, the routine maps the toolpath from the second 3-D space back to the first 3-D space. At block 1510, the routine causes the machine to mill selected portions of a workpiece, e.g., as defined by the toolpath. The routine returns at block 1512.

Figure 16:
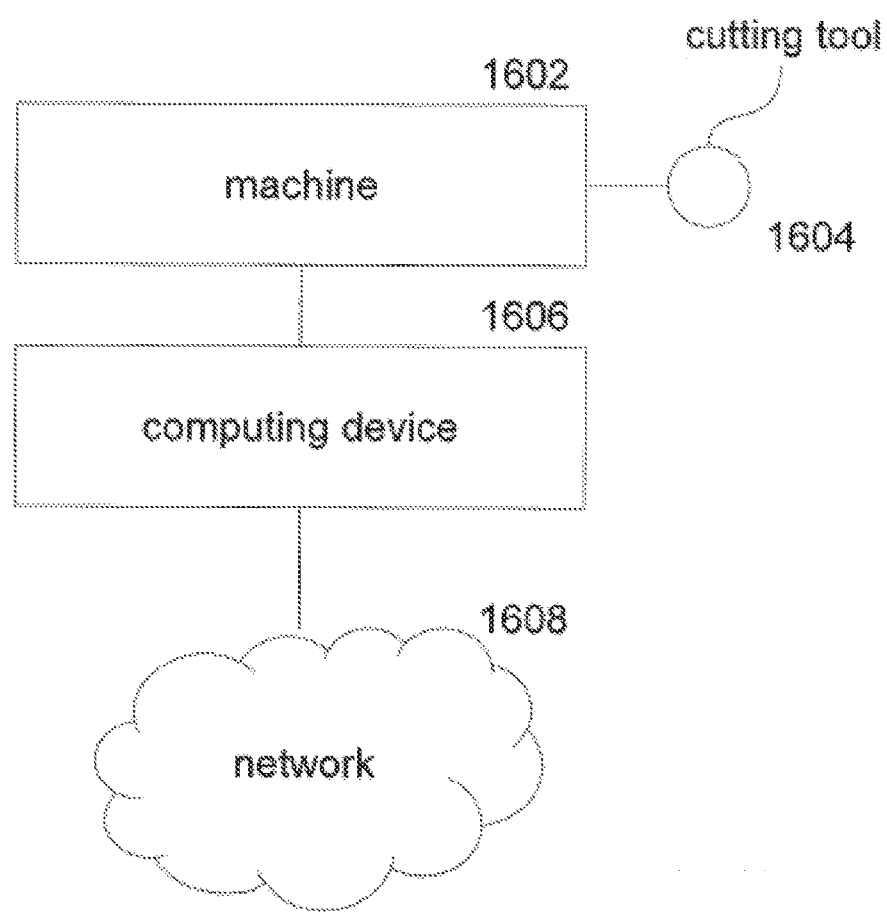
FIG. 16 is a block diagram illustrating components employed during machining in various embodiments.

FIG. 16 is a block diagram illustrating components employed during machining in various embodiments. The components can be implemented in hardware and/or software. The components can include a machine 1602, such as a milling machine. The machine can be associated with a cutting tool 1604. The machine may also be associated with a computing device 1606. The computing device may be communicably coupled with a network 1608, such as an intranet or the Internet. Other computing devices may be connected to the network (not illustrated). An operator (e.g., NC programmer) may use computing device 1606 or other computing devices to configure the machine 1602, such as by specifying various parameters. Alternatively, CAD/CAM systems may provide parameters to the machine. The CAD/CAM systems may operate on the computing device 1606 or another computing device.

In various embodiments, the table moves and the cutting tool is stationary. In various embodiments, the cutting tool moves and the table is stationary. In various embodiments, both the table and the cutting tool move.

In various embodiments, the described technology invokes various methods and employs components implemented in software and/or hardware.

Varied or Altered Aspects

Although an embodiment described herein uses the finite element method to determine tool axis vector directions, other methods could be used, such as the method of finite differences. Differently shaped finite elements could also be used, such as quadrilaterals instead of triangles. Finite element functions with different degrees of freedom may also be applicable, including finite element functions that exhibit higher orders of continuity across element boundaries.

Although the energy functional described in the first preferred embodiment is computationally simple, other energy functionals including ones described in the art may also be suitable. In addition, the described technology is not limited to the simple wall constraints described in the first preferred embodiment. Other constraints are possible, e.g., pressure constraints, forces applied at various points, fixed axis directions enforced at certain locations, and so forth. Many of these constraint types are described extensively in the literature (see, for example, U.S. Pat. No. 6,369,815, which is incorporated herein by reference).

When constructing constraints from wall geometry, it is not necessary to use intersections of isoparametric curves on offset surfaces with the reference surface. For example, the offset surfaces themselves may be extended using techniques widely used in solid modeling, and directly intersected with the reference surface. To decrease processing time and improve performance, the offset surfaces may additionally be trimmed and joined to each other.

The described technology is not limited by the use of simple projection surfaces such as planes. Other types of projections are possible, such as projections to cylinders, spheres, or free-form surfaces. Additionally, other domain mapping schemes such as triangulation flattening methods described in the art may also be used. The described technology may employ suitable mapping functions D and other reference surface types. Furthermore, the reference surface need not correspond to any surface associated with the workpiece. Indeed, when milling a workpiece where multiple levels of cut are desirable, it may be helpful to create reference surfaces above various surfaces of the workpiece.

Although application of the technology is described in relation to high-performance toolpaths, it is equally applicable to other toolpaths, e.g., constant-offset toolpaths, zig-zag toolpaths, and so on.

From the foregoing, it will be appreciated that specific embodiments of the invention have been described herein for purposes of illustration, but that various modifications may be made without deviating from the spirit and scope of the described technology. For example, method steps can be performed in various orders, include more or other steps, some steps can be removed, and so forth. Systems can include more or fewer components. The components can be implemented in software and/or hardware.

We claim:

1. A method for milling selected portions of a workpiece by a cutting tool of a numerical control machine, the numerical control machine having associated therewith a processor and a memory, comprising:
    creating a domain mapping based on the workpiece, wherein the domain mapping maps a location of a cutting tool in a three-dimensional (3-D) space to a location in a space having two or fewer dimensions;
    defining one or more constraints on a tool axis vector based, at least in part, on the created domain mapping, the tool axis vector specifying an orientation of the cutting tool;
    defining a function in accordance with the created domain mapping to determine the tool axis vector such that the one or more constraints are satisfied;
    setting the tool axis vector orientation at one or more points along a toolpath using the defined function; and
    outputting instructions based on the toolpath to control the operation of a milling machine to cause the milling machine to mill at least a portion of the workpiece.

2. The method of claim 1, wherein the domain mapping is based on a projection to a reference surface.

3. The method of claim 1, wherein a constraint on the tool axis vector requires the tool axis vector to lie in a specified plane at a specified location.

4. The method of claim 1, wherein a constraint on the tool axis vector is a spring constraint that pulls the tool axis vector towards a specified direction from a specified location.

5. The method of claim 1, wherein a constraint on the tool axis vector requires that the tool axis vector at a specified location is substantially equal to a specified direction.

6. The method of claim 1, wherein the function to determine the tool axis vector is defined to minimize an energy functional.

7. The method of claim 1, wherein the function to determine the tool axis vector is determined using a finite element technique.

8. The method of claim 1, wherein the function to determine the tool axis vector is determined using a finite difference technique.

9. A method for milling selected portions of a workpiece by a cutting tool of a numerical control machine, the numerical control machine having associated therewith a processor and a memory, the method comprising:
    defining a continuous, invertible mapping function for mapping a point from a first subset of 3-D space to a point in a second, different subset of 3-D space, wherein the first subset of 3-D space and second subset of 3-D space are both three-dimensional;
    using the mapping function to transform the workpiece into a transformed 3-D geometry;
    computing a toolpath in the second subset of 3-D space based, at least in part, on the transformed 3-D geometry;
    transforming the toolpath using the inverse of the mapping function into the first subset of 3-D space, and
    outputting instructions based on the transformed toolpath to control the operation of a milling machine to cause the milling machine to mill at least a portion of the workpiece.

10. The method of claim 9, wherein the mapping of a point from the first subset of 3-D space requires the determination of its closest point on a reference surface.

11. The method of claim 10, wherein the reference surface maps to a planar surface in the second subset of 3-D space.

12. The method of claim 10, wherein the reference surface is a floor surface of the workpiece.

13. The method of claim 9, wherein the inverse of the mapping function requires the evaluation of a surface normal on a reference surface.

14. The method of claim 9, wherein representations of both initial and final states of a workpiece are transformed by the mapping function.

15. The method of claim 9, wherein the mapping function is used to transform one or more constraints on the tool axis vector.

16. The method of claim 15, wherein the tool axis vector at one or more points of the transformed toolpath satisfies the one or more constraints.

17. The method of claim 1, wherein the milled portion is an interior portion of the workpiece.

18. The method of claim 9, wherein the milled portion is an interior portion of the workpiece.

* * * * *

UNITED STATES PATENT AND TRADEMARK OFFICE
CERTIFICATE OF CORRECTION

PATENT NO. : 10,022,833 B2
APPLICATION NO. : 13/843924
DATED : July 17, 2018
INVENTOR(S) : Evan C. Sherbrooke et al.

Page 1 of 1

It is certified that error appears in the above-identified patent and that said Letters Patent is hereby corrected as shown below:

In the Specification

In Column 4, Lines 15-16, delete "U=(ux, uy, yz)" and insert -- U=(ux, uy, uz) --, therefor.

In Column 5, Line 49, delete "$w_1$" and insert -- $w_j$ --, therefor.

In Column 8, Line 52, delete "D(p)=p'=(x, y, z)." and insert -- D(p)=p'=(x', y', z'). --, therefor.

In Column 8, Line 66, delete "$p_i$" and insert -- $p_1$ --, therefor.

In Column 9, Line 57, delete "electromechnical" and insert -- electromechanical --, therefor.

Signed and Sealed this
First Day of January, 2019

Andrei Iancu
*Director of the United States Patent and Trademark Office*